(12) United States Patent
Kuo

(10) Patent No.: US 7,114,839 B2
(45) Date of Patent: Oct. 3, 2006

(54) LIGHT-INVERSE TYPE GUIDELIGHT PLATE

(76) Inventor: Chia Shin Kuo, P.O. Box 26-757, Taipei (TW)

(*) Notice: Subject to any disclaimer, the term of this patent is extended or adjusted under 35 U.S.C. 154(b) by 85 days.

(21) Appl. No.: 10/681,809

(22) Filed: Oct. 6, 2003

(65) Prior Publication Data

US 2005/0073825 A1   Apr. 7, 2005

(51) Int. Cl.
*F21V 8/00* (2006.01)
*F21V 7/04* (2006.01)

(52) U.S. Cl. ............ 362/608; 362/609; 362/612; 362/621

(58) Field of Classification Search ............ 362/31, 362/29, 30, 555, 560, 561, 341, 347, 244, 362/623, 610, 609, 621, 608, 612, 615
See application file for complete search history.

(56) References Cited

U.S. PATENT DOCUMENTS

| | | | |
|---|---|---|---|
| 6,481,130 B1 * | 11/2002 | Wu | 40/546 |
| 6,712,481 B1 * | 3/2004 | Parker et al. | 362/619 |
| 2004/0125590 A1 * | 7/2004 | Tsai | 362/31 |
| 2005/0030729 A1 * | 2/2005 | Yu et al. | 362/31 |

* cited by examiner

Primary Examiner—Sandra O'Shea
Assistant Examiner—Guiyoung Lee
(74) Attorney, Agent, or Firm—Rosenberg, Klein & Lee

(57) ABSTRACT

A light-inverse type guidelight plate adopted for a backlight module having at least one lighting member includes a reflection portion, a reflecting member partially covering the reflection portion, and a light-guiding portion connecting the reflection portion for providing a displaying region. Wherein the light-guiding portion locates behind the lighting member's back, which faces the reflecting member and dispose in a slot of the reflection portion. The light-guiding portion is shaped variously to meet requirements. The reflection portion has a reflection face, which reflects light emitted from the lighting member to the light-guiding portion to get a high uniformity thereof.

25 Claims, 6 Drawing Sheets

LIGHT-INVERSE TYPE GUIDELIGHT PLATE

BACKGROUND OF THE INVENTION

1. Field of the Invention

The present invention relates to a light-inverse type guidelight plate. More particularly, the present invention relates to a light-inverse type guidelight plate with a high uniformity.

2. Background of the Invention

As consumable electrical goods develop, the backlight modules, which provide lighting, are broadly applied to various fields. Such as a cell phone, a notebook, a screen or a keystroke of a PDA, a Touch-pad, and even a Pointing Sticks.

Referring to FIG. 1, the conventional guidelight plate 1a is adopted for a backlight module, which has a LED (Light Emitting Diode) 5a facing a displaying region 6 of the guidelight plate 1a and disposed on an edge of a body 10a of the guidelight plate 1a. The LED 5a has a various lighting angle α depending on each plant's processing or design ability. The lighting angle α is determined and sandwiched by a first guiding path 51a and a second guiding path 52a respectively being the broadest limits. The edge of a body 10a, where the LED 5a disposed, symmetrically has two lateral side portions having no light and being dark, where each defines a dark region d, and the conventional guidelight plate 1a cannot have the light evenly transferring around therein and cannot get a high uniformity.

Hence, the prior art improved is required to overcome the disadvantages thereof.

SUMMARY OF INVENTION

The object of the invention is therefore to specify a light-inverse type guidelight plate to meet various requirements of shapes thereof and get a high uniformity.

According to the invention, this object is achieved by a light-inverse type guidelight plate adopted for a backlight module, which has at least one lighting member, and including a reflection portion, a reflecting member partially covering the reflection portion and a light-guiding portion connecting the reflection portion for providing a displaying region. Wherein the light-guiding portion locates behind the lighting member's back, which faces the reflecting member and dispose in a slot of the reflection portion.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
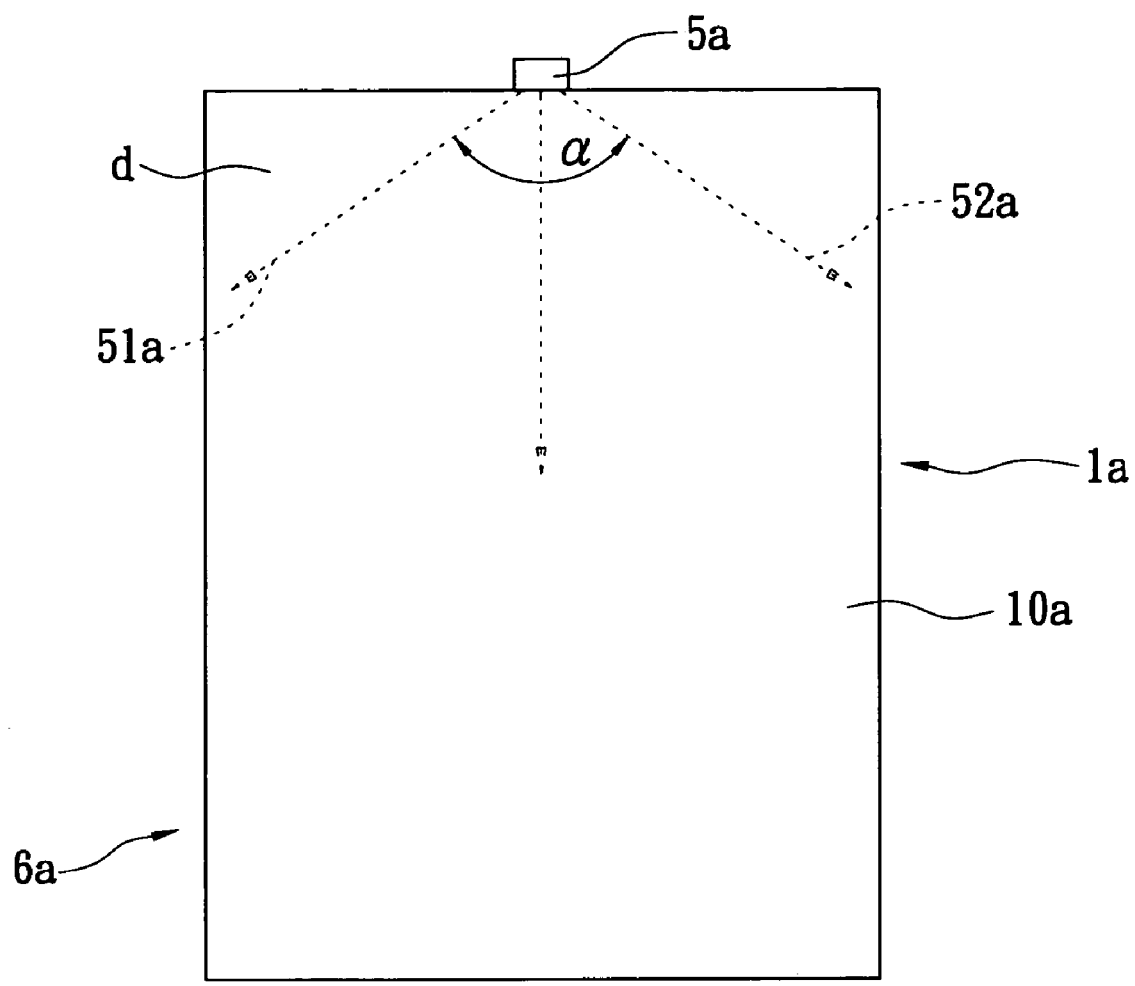
FIG. 1 is a perspective view of a conventional guidelight plate.
Figures 2A, 2B:
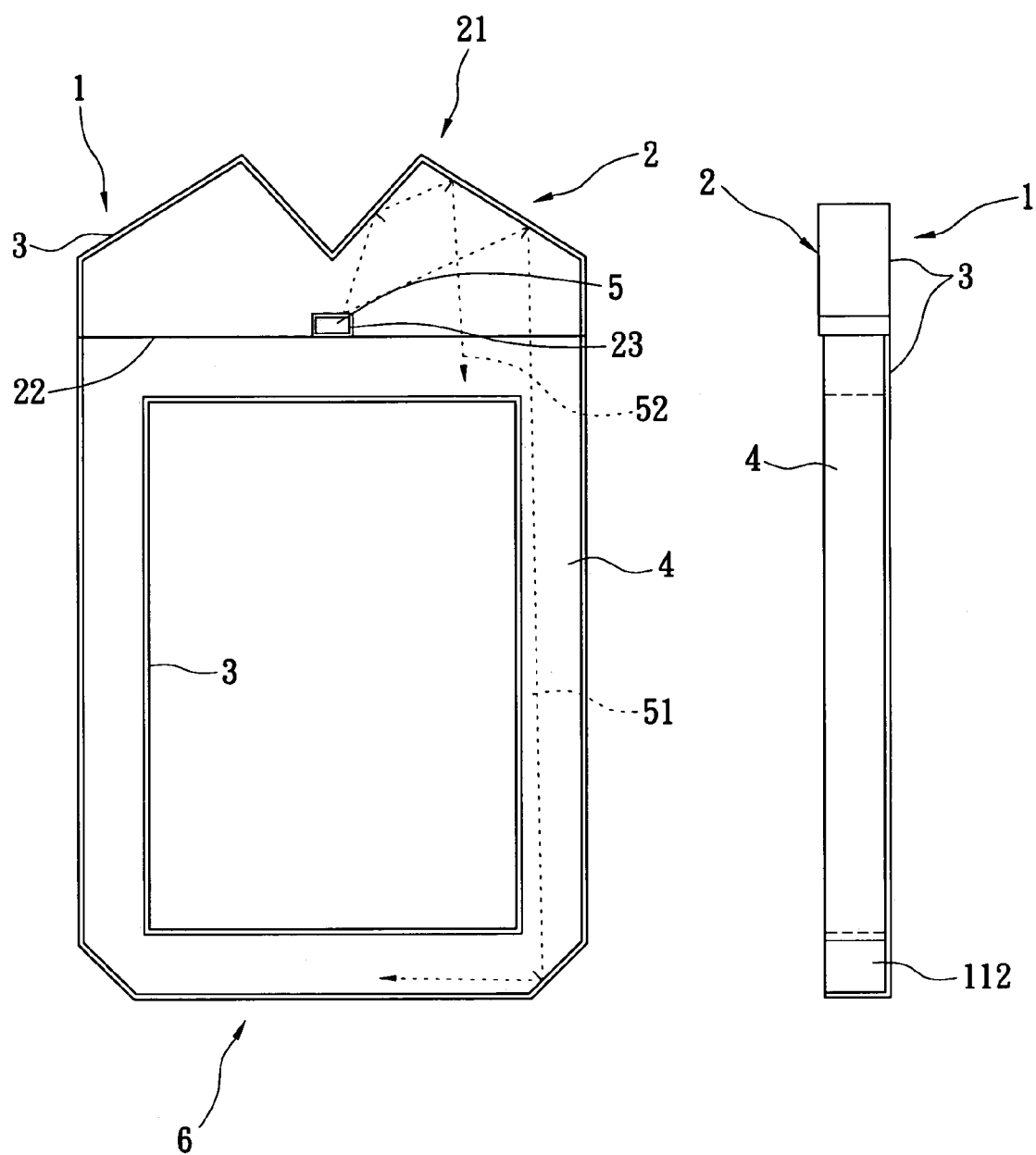
FIG. 2A is a front view of the present invention.
FIG. 2B is a side view of the present invention.

Referring to FIG. 2A to FIG. 2B, the present invention provides a light-inverse type guidelight plate 1 is applied to a backlight module having at least one lighting member 5, the guidelight plate 1 includes at least one reflection portion 2, a reflecting member 3 covering the reflection portion 2, and a predetermined shaped light-guiding portion 4 for providing a displaying region 6 formed thereon. Wherein the reflection portion 2 has at least one reflection face 21, a transmitting face 22 connecting the reflection face 21, and at least one slot 23 being concave on the transmitting face 22 and receiving the lighting member 5. The reflection face 21 is arc-shaped, or parabolic shaped to reflect light to be parallel, or the reflection face 21 is straightly lined, moreover, the reflection portion 2 has a pair of the reflection faces 21 connecting to each other and including a predetermined angle sandwiched therebetween.

In addition, the lighting member 5 is a spot light source and has non-parallel light because of a lighting angle thereof. The lighting angle varies as different plants by their design and manufacturing abilities. The lighting member 5 usually is a LED, and generally speaking, the lighting angle of the LED is between 70 degree and 120 degree. The present invention provides the reflection face 21 to enlarge the region the light transfers, and provides a variable angle sandwiched between the reflection faces 21 to get various reflecting effects, so as to the light transmitting to the light-guiding portion 4 is no more limited by the lighting angle of the lighting member 5, and the light-guiding portion 4 got a high uniformity. The light-guiding portion 4 connects the transmitting face 22 of the reflection portion 2. The light-guiding portion is less than 2 mm. Wherein, the light-guiding portion 4 locates behind the lighting member 5's back, which faces the reflection face 21 of the reflecting member 3 and dispose in the slot 23 of the reflection portion 2. Whereby, the reflection face 21 reflects the light emitting from the lighting member 5 through the transmitting face 22 to the light-guiding portion 4. The reflecting member 3 covers the reflection portion 2 to reduce optical losses of the light by reflecting light, which transmits out of the reflection portion 2, back. The light-guiding portion 4 is in various shapes to connect with the reflection portion 2; accordingly, the light-guiding portion 4 with light transmitting therein and out thereof defines the displaying region 6.

In one embodiment, the light-guiding portion 4 is in a frame shape, such as a rectangular, an angulated, a circular shape, or the like to meet various requirements. See in the FIG. 2A the light-guiding portion 4 is a rectangular frame, the reflecting member 3 covers a bottom, further covers a outside or further covers a inside thereof, the displaying region 6 is along the rectangular shape. Wherein the light first emits from the lighting member 5, and passes along a first guiding path 51, which guides the light reflected once by the reflection face 21 to the light-guiding portion 4 and then reflected once by one of reflection slants 41 of the light-guiding portion 4, and a second guiding path 52 second, which guides the light reflected twice by the reflection face 21 to the light-guiding portion 4 to evenly transmit through the light-guiding portion 4. The light-guiding portion 4 includes two reflection slant 41 respectively concaved on two opposing sides of an end opposing to the reflection potion 2, the reflection slant 41 each is adjusted to get a variable depth to provide a predetermined transmitted flux therein.

Figure 3A:
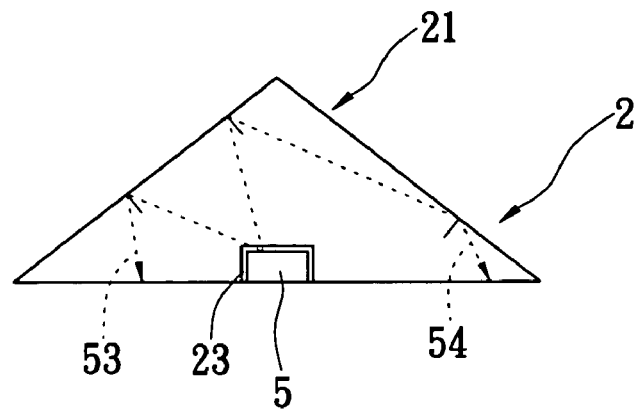
FIG. 3A is perspective view of a first embodiment of a reflection portion according to the present invention.

With respect to FIG. 3A, the reflection portion 2 is composed of a pair reflection faces 21 and the transmitting face 22, the lighting member 5 is disposed in the slot 23, the light passes along a third guiding path 53, which guides the light reflected by one of the reflection faces 21 to the transmitting face 22, and a fourth guiding path 54, which guides the light reflected by one of the reflection faces 21 to the other and again reflected to the transmitting face 22.

Figure 3B:
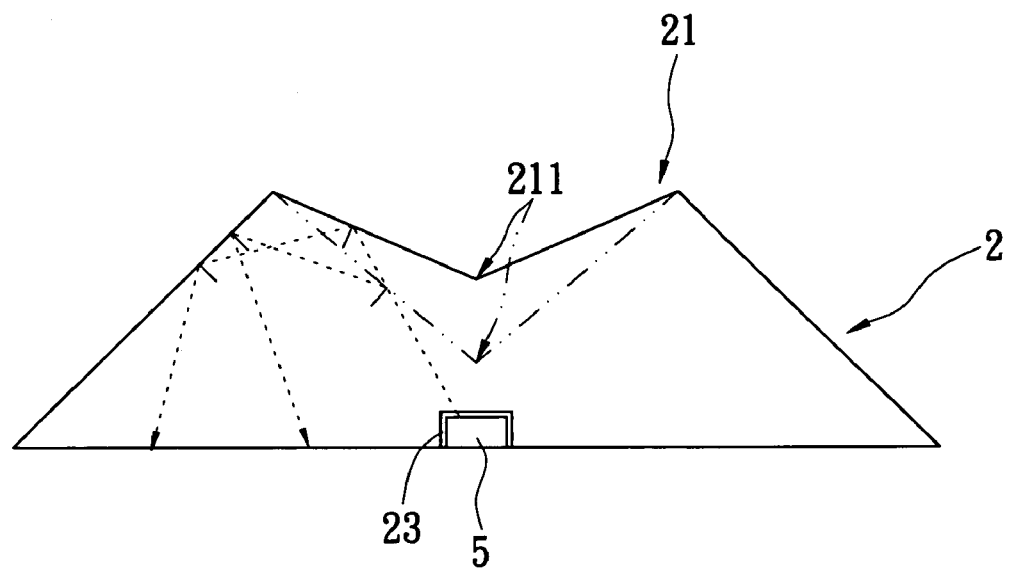
FIG. 3B is perspective view of a second embodiment of the reflection portion according to the present invention.

With respect to FIG. 3B, the reflection portion 2 is composed of a couple of reflection face pairs 21 and the transmitting face 22, reflection face pairs 21 symmetrically connects to each other by a recess 211. The lighting member 5 emits light facing to the recess 211, the closer the recess 211 moves to the lighting member 5, the larger an incident angle of the light to the recess 211 is, so as to the light transmits more evenly.

Figure 3C:
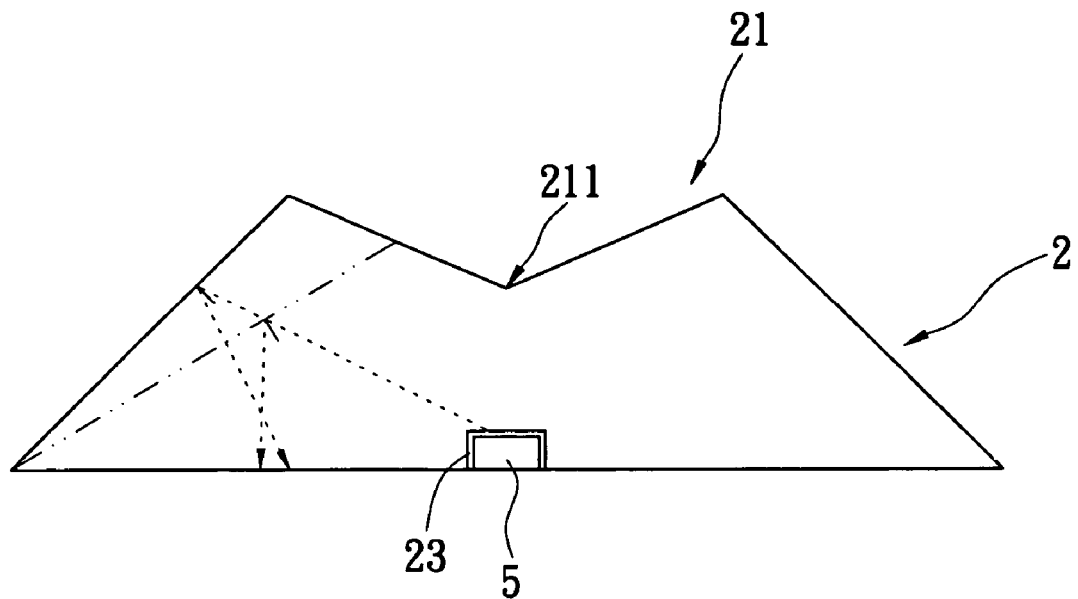
FIG. 3C is perspective view of a third embodiment of the reflection portion according to the present invention.

With respect to FIG. 3C, the less the angle sandwiched between the reflection faces 21 is, the evenly the light transmits, according to the FIGS. 3B and 3C, the present invention can adjust the recess 211 and angle sandwiched between the reflection faces 21 to get a even distribution of the light and a high uniformity thereof.

Figure 3D:
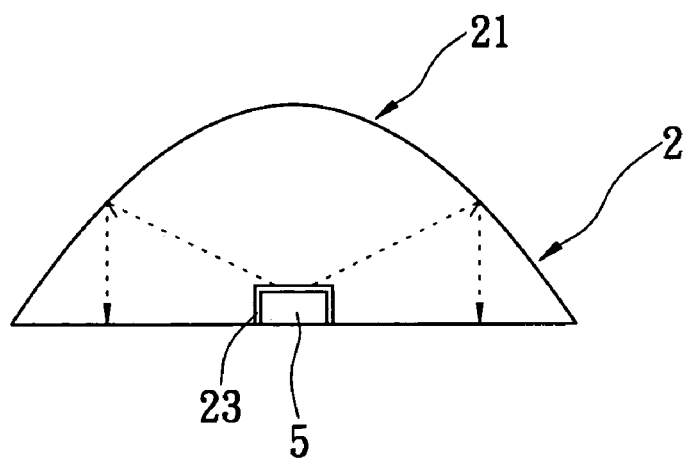
FIG. 3D is perspective view of a fourth embodiment of the reflection portion according to the present invention.

With respect to FIG. 3D, the reflection face 21 is shaped like a parabola, the slot 23 where the lighting member 5 disposes locates on a focus of the parabola for the light transferring parallel after reflecting by the reflection face 21.

Figure 3E:
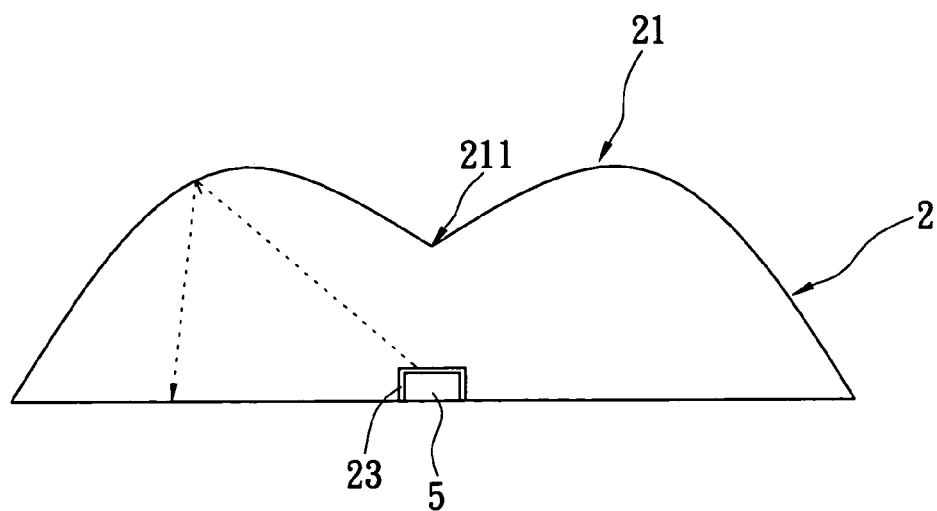
FIG. 3E is perspective view of a fifth embodiment of the reflection portion according to the present invention.

With respect to FIG. 3E, the reflection portion 2 is reflection face is arc-shaped, accordingly, curvature adjusting is also one way to improve the uniformity thereof.

Figure 4:
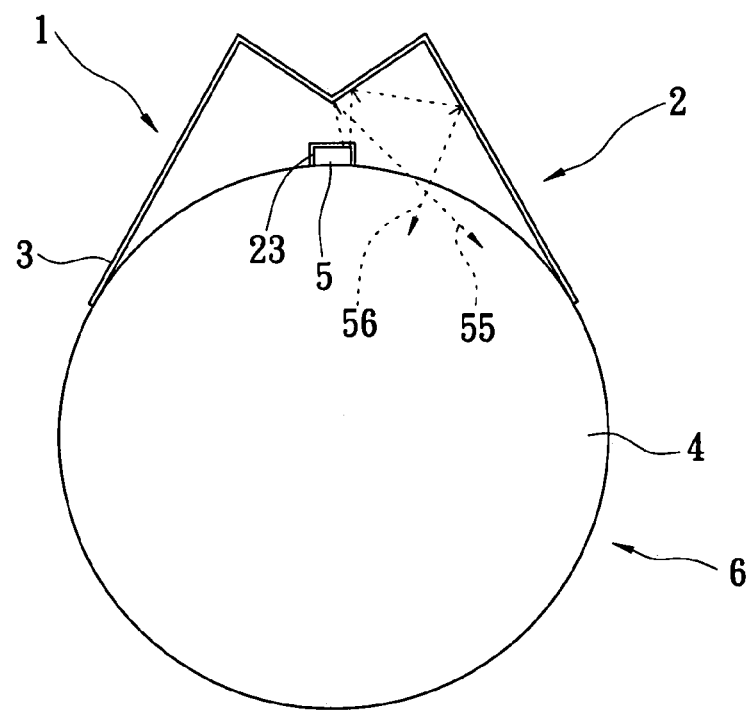
FIG. 4 is perspective view of an embodiment of a light-guiding portion according to the present invention.

Referring to FIG. 4, the light-guiding portion 4 is in a circular shape, the lighting member 5 is disposed in the slot 23 and facing the refection face 21, the light passes along a fifth guiding path 55, which guides the light reflected by one of the reflection faces 21 to the light-guiding portion 4, and a sixth guiding path 56, which guides the light reflected by one of the reflection faces 21 to the other and again reflected to the light-guiding portion 4, which has the circular shape.

Figure 5:
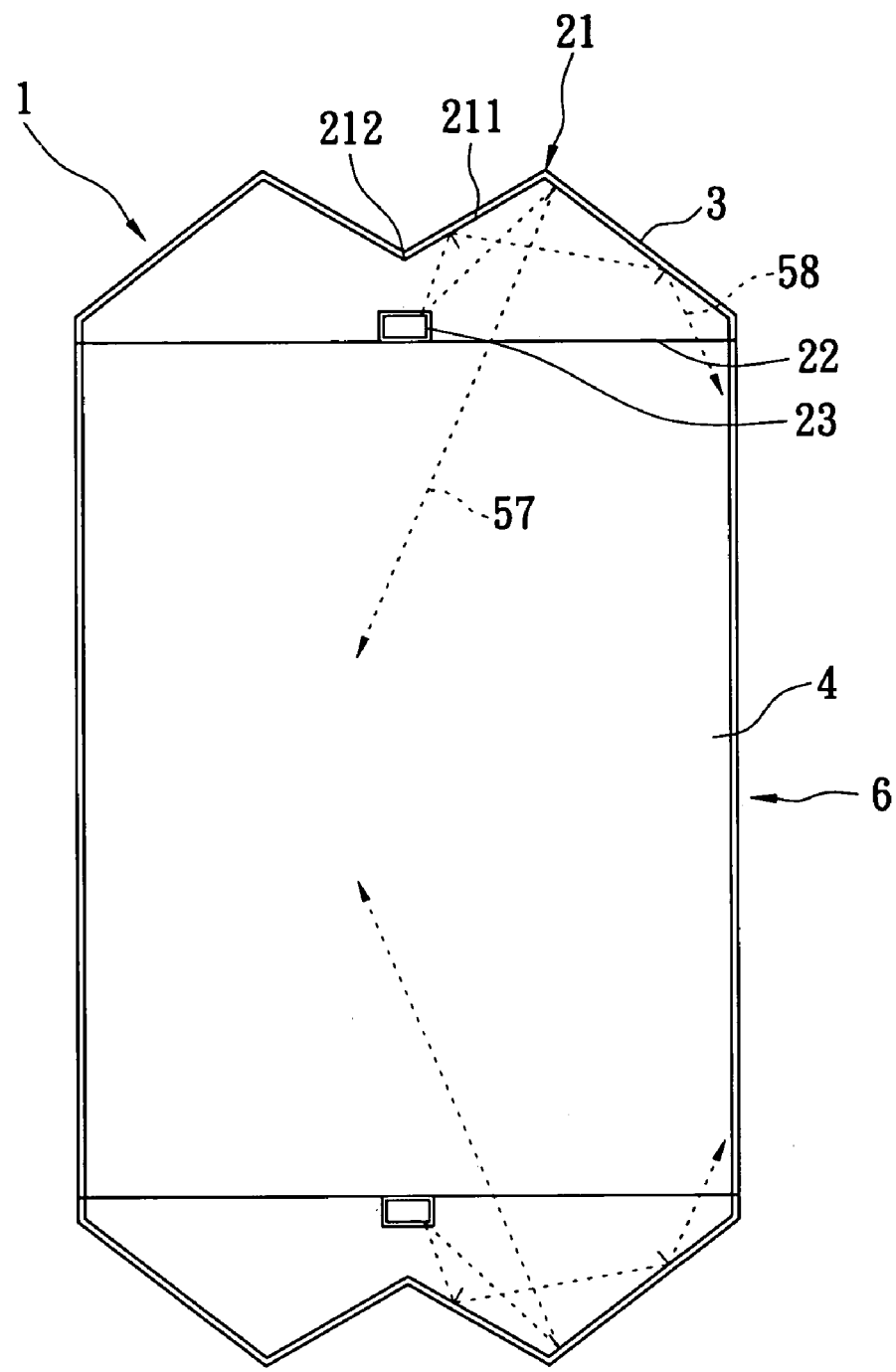
FIG. 5 is perspective view of another embodiment of the light-guiding portion according to the present invention.

Referring to FIG. 5, the light-guiding portion 4 is in a rectangular shape; another embodiment of the present invention includes two reflection portions 2 respectively disposed on opposing sides of the light-guiding portions 4 and two lighting members 5 respectively disposed in two slots 23 therein and obey the rule, facing the reflection face 21. The light respectively passes along a seventh guiding path 57, which guides the light reflected by one of the reflection faces 21 to the light-guiding portion 4, and a eighth guiding path 58, which guides the light reflected by one of the reflection faces 21 to the other and again reflected to the light-guiding portion 4.

The present invention uses the light-guiding portion 4 locates behind the lighting member 5's back, which the lighting member 5 obey the rule facing the reflecting member, and dispose in the slot 23 of the reflection portion 2, so as to the light-inverse type guidelight plate 1 got a high uniformity. The present invention should be applied to not only consumable electrical goods but also products for recognizing or indicating.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A light-inverse type guidelight plate for a backlight module having at least one lighting member, comprising:
    at least one reflection portion having at least a first and a second arc-shaped reflection faces, each of said at least first and second arc-shaped reflection faces having a first end and a second end, said first arc-shaped reflection face being connected at said second end thereof to said first end of said second arc-shaped reflection face,
    a transmitting face connected to said first arc-shaped reflection face at said first end thereof and to said second arc-shaped reflection face at said second end thereof, said transmitting face including a single concave slot formed thereat, a lighting member being received in said single concave slot, wherein said at least first and second arc-shaped reflection faces of said at least one reflection portion are arranged with a single lighting member received in said single concave slot, said single lighting member emitting light to said at least first and second arc-shaped reflection faces to be reflected therefrom;
    a reflecting member covering the reflection portion; and
    a predetermined-shaped light-guiding portion connected to the transmitting face for providing a displaying region thereon, the light guiding portion having a thickness of less than 2 mm; wherein the light-guiding portion locates behind the lighting member's back, and wherein a light emitting portion of the lighting member faces the reflecting member.

2. The light-inverse type guidelight plate as the claim 1, wherein the lighting member is an LED.

3. The light-inverse type guidelight plate as the claim 1, wherein the reflecting member further covers the light-guiding portion.

4. The light-inverse type guidelight plate as the claim 1, wherein the light-guiding portion is frame shaped.

5. The light-inverse type guidelight plate as the claim 4, wherein the reflecting member further covers an outside of the light-guiding portion.

6. The light-inverse type guidelight plate as the claim 5, wherein the reflecting member further covers an inside of the light-guiding portion.

7. The light-inverse type guidelight plate as the claim 4, wherein the light-guiding portion includes two reflection slant respectively concaved on two opposing sides of an end opposing to the reflection potion, the reflection slant each is adjusted to get a variable depth to provide a predetermined transmitted flux therein.

8. The light-inverse type guidelight plate as the claim 1, wherein the light-guiding portion is plane shaped.

9. A guidelight plate for a backlighting module comprising:
    at least one reflecting portion having at least a pair of reflection faces and a transmitting face, each of the at least a pair of reflection, faces in opposing spatial relationship with the transmitting face, the transmitting face having formed thereon a slot for receiving a corresponding lighting member;

a lighting member disposed in said slot, wherein light emitted by the lighting member faces said at least a pair of reflection faces and is transversely confined within a predetermined transmission angle, the lighting member being disposed in the slot so that the confined light is directed towards said at least a pair of reflection faces and is reflected thereat towards the transmitting face;

a reflecting member disposed on the at least one reflecting portion; and a light-guiding portion coupled to the transmitting face of the reflecting portion in coplanar spatial relationship with the at least one reflecting portion, the lighting member being captured between the light-guiding portion and the reflecting portion by the slot formed therein, the light-guiding portion defining a display region thereon.

10. The guidelight plate for a backlighting module as recited in claim 9, wherein the predetermined transmission angle is not greater than 120 degrees.

11. The guidelight plate for a backlighting module as recited in claim 9, wherein the at least one reflecting portion includes a pair of reflection faces.

12. The guidelight plate for a backlighting module as recited in claim 11, wherein each of the pair of reflection faces includes a pair of planar reflecting surfaces.

13. The guidelight plate for a backlighting module as recited in claim 12, wherein the pair of reflection faces are adjacently joined each to the other, one planar reflecting surface from each adjacent reflecting face defining a predetermined angle therebetween.

14. The guidelight plate for a backlighting module as recited in claim 11, wherein each of the pair of reflecting faces is actuate.

15. The guidelight plate for a backlighting module as recited in claim 9, wherein the reflecting member is further disposed in the display region.

16. The guidelight plate for a backlighting module as recited in claim 15, wherein the light-guiding portion includes an outer periphery and an inner periphery, the inner periphery enclosing a region of the display region on which the reflecting member is disposed.

17. The guidelight plate for a backlighting module as recited in claim 16, wherein the reflecting member is further disposed on the outer periphery of the light-guiding portion.

18. The guidelight plate for a backlighting module as recited in claim 17, wherein the reflecting member is further disposed on the inner periphery of the light-guiding portion.

19. The guidelight plate for a backlighting module as recited in claim 16, wherein the light-guiding portion includes a reflection slant on the outer periphery at each of two opposing sides thereof on an end thereof opposite the transmitting face, each reflection slant forming a predetermined angle with respect to a longitudinal edge of the light-guiding portion so as to provide a predetermined transmitted flux therein.

20. The guidelight plate for a backlighting module as recited in claim 9, wherein the reflection face defines a parabola, the slot in the transmitting face being located at a focus of the parabola.

21. A guidelight plate for a backlighting module comprising:

at least one reflecting portion having at least one reflection face and a transmitting face, each of the at least one reflection face in opposing spatial relationship with the transmitting face, the transmitting face having formed thereon at least one slot for receiving a corresponding lighting member;

a lighting member disposed in each of the at least one slot, where light emitted by the lighting member is transversely confined to a predetermined transmission angle, the lighting member being disposed in the slot so that the confined light is directed towards the at least one reflection face and is reflected thereat towards the transmitting face;

a reflecting member disposed on the at least one reflecting portion; and a light-guiding portion coupled to the transmitting face of the reflecting portion in coplanar spatial relationship with the at least one reflecting portion, the lighting member being captured between the light-guiding portion and the reflecting portion by the slot formed therein, the light-guiding portion defining a display region thereon, wherein the reflecting member is further disposed in the display region, and wherein the light guiding portion includes an outer periphery and an inner periphery, the inner periphery enclosing a region of the display region on which the reflecting member is disposed.

22. The guidelight plate for a backlighting module as recited in claim 21, wherein the reflecting member is further disposed on the outer periphery of the light-guiding portion.

23. The guidelight plate for a backlighting module as recited in claim 22, wherein the reflecting member is further disposed on the inner periphery of the light-guiding portion.

24. The guidelight plate for a backlighting module as recited in claim 21, wherein the light-guiding portion includes a reflection slant on the outer periphery at each of two opposing sides thereof on an end thereof opposite the transmitting face, each reflection slant forming a predetermined angle with respect to a longitudinal edge of the light-guiding portion so as to provide a predetermined transmitted flux therein.

25. The guidelight plate for a backlighting module as recited in claim 21, wherein the reflection face defines a parabola, the slot in the transmitting face being located at a focus of the parabola.

* * * * *